US011632391B2

(12) United States Patent
Doron et al.

(10) Patent No.: US 11,632,391 B2
(45) Date of Patent: Apr. 18, 2023

(54) SYSTEM AND METHOD FOR OUT OF PATH DDOS ATTACK DETECTION (71) Applicant: RADWARE, LTD., Tel Aviv (IL)

(72) Inventors: Ehud Doron, Moddi'in (IL); Yotam Ben Ezra, Ra'anana (IL); David Aviv, Tel Aviv (IL)

(73) Assignee: RADWARE LTD., Tel Aviv (IL)

( * ) Notice: Subject to any disclaimer, the term of this patent is extended or adjusted under 35 U.S.C. 154(b) by 179 days.

(21) Appl. No.: 16/212,042

(22) Filed: Dec. 6, 2018

(65) Prior Publication Data

US 2019/0182266 A1 Jun. 13, 2019

Related U.S. Application Data (60) Provisional application No. 62/596,251, filed on Dec. 8, 2017.

(51) Int. Cl.
*H04L 9/40* (2022.01)
*H04W 12/06* (2021.01)
*H04W 12/122* (2021.01)

(52) U.S. Cl.
CPC ........ *H04L 63/145* (2013.01); *H04L 63/1425* (2013.01); *H04W 12/06* (2013.01); *H04W 12/122* (2021.01); *H04L 63/0892* (2013.01); *H04L 63/1416* (2013.01); *H04L 2463/141* (2013.01)

(58) Field of Classification Search
None
See application file for complete search history.

(56) References Cited

U.S. PATENT DOCUMENTS

| 9,516,053 B1* | 12/2016 | Muddu ............... G06V 10/225 |
| 10,205,735 B2* | 2/2019 | Apostolopoulos ......................... H04L 63/1425 |
| 2010/0034102 A1* | 2/2010 | Wang ................. H04L 41/0893 370/252 |
| 2011/0302290 A1* | 12/2011 | Westerfeld ............... G06F 8/71 709/223 |
| 2012/0084866 A1* | 4/2012 | Stolfo ................. H04L 63/1416 726/25 |
| 2015/0215334 A1* | 7/2015 | Bingham ............ H04L 63/1425 726/23 |

(Continued)

FOREIGN PATENT DOCUMENTS

WO WO-2017147411 A1 * 8/2017 ........... H04L 67/322

OTHER PUBLICATIONS

Nimrod Dezent, Asaf Shahar, Itai Ephraim Zilbershtein; "System, Device and Method of Adaptive Network Protection for Managed Internet-of-Things Services"; filed Jun. 27, 2017—(U.S. Appl. No. 62/525,202), pp. 1-7 (Year: 2017).*

*Primary Examiner* — Arezoo Sherkat
(74) *Attorney, Agent, or Firm* — M&B IP Analysts, LLC (57) ABSTRACT

A system and method for out-of-path detection of cyber-attacks are provided. The method includes receiving, by a detector, a plurality of data feeds from a plurality of data sources, wherein the detector is communicatively connected to the plurality of data sources; processing, by the detector, the plurality of received data feeds to generate enriched Flow data sets; analyzing the enriched Flow data sets to detect a potential cyber-attack; and upon detection of a potential cyber-attack, providing indication to each network entity of the network entities that is under attack.

18 Claims, 8 Drawing Sheets (56) References Cited

U.S. PATENT DOCUMENTS

| | | | |
|---|---|---|---|
| 2016/0006753 A1* | 1/2016 | McDaid | H04W 4/70 726/23 |
| 2017/0063920 A1* | 3/2017 | Thomas | H04L 63/1408 |
| 2018/0027006 A1* | 1/2018 | Zimmermann | H04L 63/0245 726/11 |
| 2018/0176237 A1* | 6/2018 | Freedman | G06F 21/566 |
| 2018/0191768 A1* | 7/2018 | Broda | H04L 63/1425 |
| 2018/0248893 A1* | 8/2018 | Israel | G06N 5/025 |
| 2018/0307943 A1* | 10/2018 | Savkli | G06K 9/6284 |
| 2018/0332064 A1* | 11/2018 | Harris | G06F 15/16 |
| 2019/0380037 A1* | 12/2019 | Lifshitz | H04L 43/12 |

* cited by examiner

SYSTEM AND METHOD FOR OUT OF PATH DDOS ATTACK DETECTION

CROSS-REFERENCE TO RELATED APPLICATIONS

This application claims the benefit of U.S. Provisional Application No. 62/596,251 filed on Dec. 8, 2017, the contents of which are hereby incorporated by reference.

TECHNICAL FIELD

The present disclosure relates generally to cyber security, and more specifically to detecting DDoS attacks.

BACKGROUND

Large scale networks are typically composed of two types of networks, an edge (or access) network and a backbone network. An edge network provides network connectivity to user devices or hosts while the backbone network connects two or more edge networks together. Examples of large-scale networks include cloud computing platforms, data centers, service provider networks, and the like. The architecture of a large-scale network is constructed as a multi-tiered network including a backbone network as a main (root) tier and a plurality of the edge networks which are child tier connected to a main tier. Typically, there is one backbone network entity and many edge networks that are connected thereto. The edge networks may be connected in a tiered architecture as well.

In recent years, carriers, telephone companies, Internet service providers, and other service providers utilizing large scale networks have been suffering from devastating Denial of Service (DoS) and Distributed DoS (DDoS) (DoS and DDoS referred to collectively as DoS, merely for simplicity purposes) attack campaigns. DoS attackers typically have two major objectives: overwhelm various parts of the service provider's infrastructure to interfere with connectivity, and attack services and end points to disrupt the services or their functionalities. Because service providers seek to provide high speed and reliable services, frequent DoS attacks may significantly affect business as customers become dissatisfied with poor service performance.

Some techniques for mitigating DoS attacks include Out of Path (OOP) attack detection and mitigation. When an attack is detected based on deviations from normal traffic flows, the attack traffic may be diverted to a "scrubbing center" configured to clean the attack traffic and redirect the cleaned traffic to the original destination. The attack detector can be deployed on premises, or as software as a service (SaaS) in the cloud.

As opposed to inline detection, OOP detection does not require deploying a detector inline of traffic flows. However, although OOP detection offers some convenience in this regard, OOP detection techniques tend to detect and mitigate less efficiently and accurately than inline detection techniques. As one example, OOP detectors respond to DoS and DDoS attacks slower than their inline counterparts. As another example, OOP detection utilizing only Flow data (e.g., NetFlow) may result in high numbers of false positives and false negatives.

Moreover, existing solutions for DoS detection typically involve either threshold-based detection or anomaly detection. Threshold-based detection involves comparing various traffic flow parameters such as total number of packets or total amount of traffic to thresholds manually set by, for example, a network operations center (NOC) or security operations center (SOC). When a traffic flow parameter exceeds a corresponding threshold, an attack may be detected. Utilization of manual threshold may result in excessive numbers of false positives, or false negative, and, therefore, can result in inaccurate detection and inefficient mitigation. Additionally, manual configuration of thresholds may be cumbersome, particularly for more complicated large-scale networks. Oversimplification of networks and, accordingly, thresholds, may result in failure to accurately detect attacks.

Anomaly detection involves learning "normal" behavior to identify anomalous behavior. Anomaly detection may face challenges in efficiently collecting and analyzing data, particularly when larger and more complicated systems, or networks, are involved. Further, Flow data (e.g., NetFlow) is the only source used by existing anomaly detectors (implementing threshold detection) and, thus, existing detectors do not account for all information that may be relevant to detecting anomalous behavior. For example, anomaly detectors do not utilize the actual source or destination of traffic, as such detectors typically rely on IP address based telemetries to derive the required statistics rather than the real identities of these entities. However, in many cases, IP addresses cannot identify the actual entities receiving the traffic (can be changed for many reasons), and therefore make the task of anomaly detection difficult or even not practical. In addition, the existing solutions for anomaly detection become impractical when approaching large-scale networks with hundreds of thousands of IPs that are active in such networks.

To enable DoS attack detection, an attack detector is required to aggregate and analyze traffic flows to find anomalies or attack patterns. Some major challenges for attack detectors include the scalability needed to collect and process millions of flows per second, as well as the need to apply accurate algorithms that allow for rapid detection with low probability of false positives and false negatives. Moreover, existing solutions do not allow for correlating DoS attack traffic data with network topology or other sources of data. Thus, analysis and interpretation of DoS attack traffic, based on Flow data (e.g., NetFlow) alone, does not provide the full story of an attack, thereby limiting effectiveness of detection and the mitigation that can be achieved.

Moreover, existing solutions for DoS attack detection typically rely on characteristics of the targets of the attack such as IP addresses of the destination or other characteristics that may be shared by multiple entities. For example, the same destination IP address may be utilized by different entities at different times. However, such solutions face challenges in accurately identifying entities, as such characteristics do not uniquely identify entities. Failure to accurately identify entities may result in failing to successfully mitigate or detect DoS attacks.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for out-of-path detection of cyber-attacks. The method comprises receiving, by a detector, a plurality of data feeds from a plurality of data sources, wherein the detector is communicatively connected to the plurality of data sources; processing, by the detector, the plurality of received data feeds to generate enriched Flow data sets; analyzing the enriched Flow data sets to detect a potential cyber-attack; and upon detection of a potential cyber-attack, providing indication to each network entity of the network entities that is under attack.

Certain embodiments disclosed herein also include a system for out-of-path detection of cyber-attack. The system comprising: a processing circuitry; and a memory, the memory containing instructions that, when executed by the processing circuitry, configure the system to: receive, by a detector, a plurality of data feeds from a plurality of data sources, wherein the detector is communicatively connected to the plurality of data sources; process, by the detector, the plurality of received data feeds to generate enriched Flow data sets; analyze the enriched Flow data sets to detect a potential cyber-attack; and provide indication to each network entity of the network entities that is under attack, upon detection of a potential cyber-attack.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for out of path (OOP) distributed denial of service (DDoS) attack detection. The disclosed embodiments allow for efficient and accurate detection of DDoS attacks without deploying an inline device. Various embodiments disclosed herein may include enriching traffic Flow data (e.g., NetFlow) with other types of data for user awareness, application and service awareness, and traffic attributes. In some implementations, machine learning techniques may be utilized to learn and categorize or otherwise analyze enriched Flow data.

The disclosed embodiments provide techniques for ingestion, enrichment, and storage of data that allow for massively and scalable collection and analysis of high volumes of data, from a variety of sources and having a variety of characteristics to detect DDoS attacks. Specifically, Flow data is ingested and enriched to create enriched feeds of Flow data, both in real-time, when data is collected, and in batches (i.e., when other related data) is later received. Accordingly, disadvantages of analyzing only the Flow data are overcome. As various data sources are accounted for, the disclosed embodiments allow for detecting additional types of DDoS attacks using an OOP detector.

Figure 1:
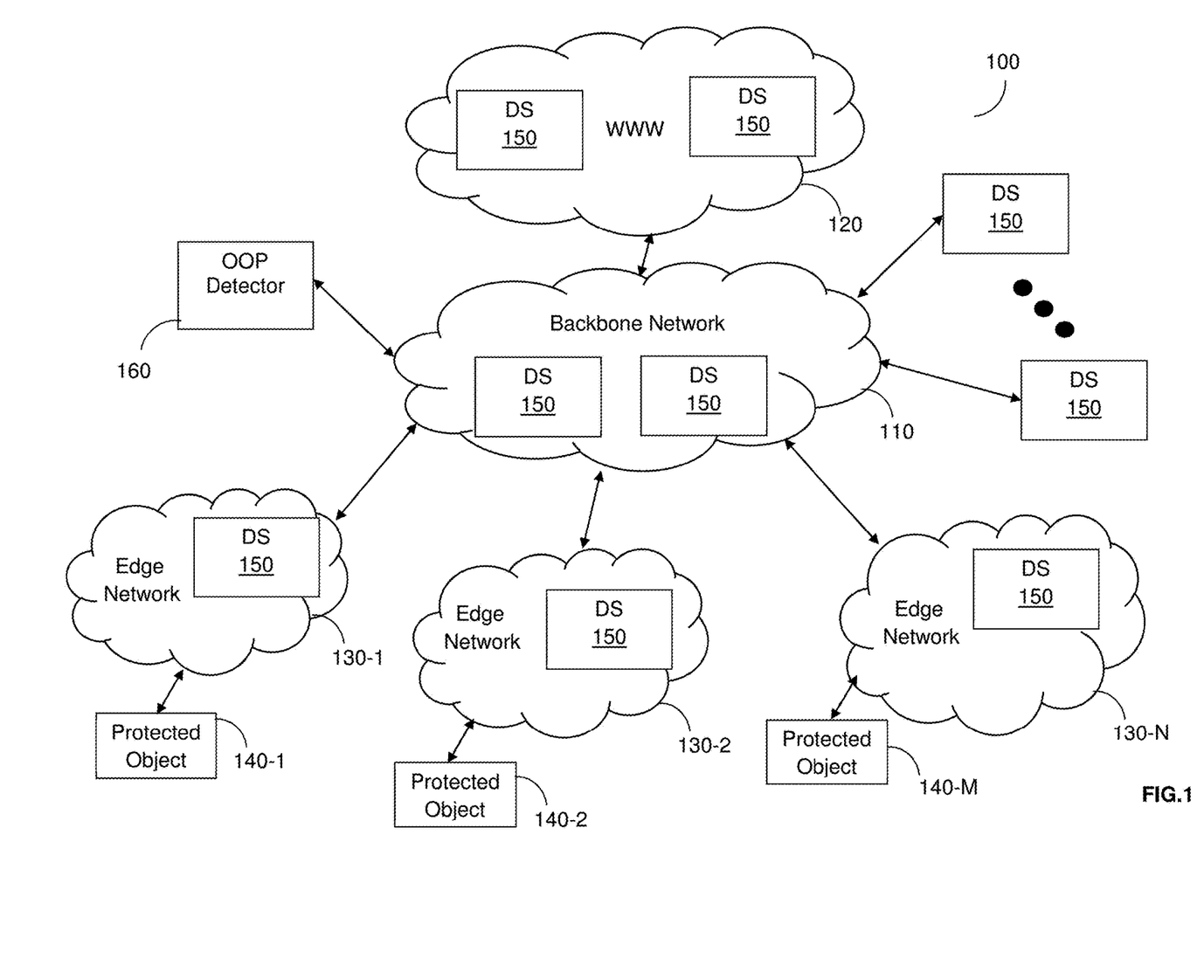
FIG. 1 is a network diagram in accordance with various embodiments.

FIG. 1 illustrates an example network 100 in accordance with various embodiments. Network 100 may include a backbone network 110 connected to the World Wide Web (WWW) 120 and to a plurality of edge networks 130-1 through 130-N (collectively referred to hereinafter as edge networks 130 or individually as an edge network 130). The backbone network 110 may be operated or maintained by an Internet service provider (ISP) or other service provider, a network carrier, a cloud provider, and the like. The edge network 130 may be a datacenter, an enterprise network, a mobile network, an Internet of Things (IoT) network, and the like. The edge network 130 allows access to a plurality of computing resources (not shown). Such resources may be accessed by any computing device.

As shown in FIG. 1, a plurality of protected objects 140-1 through 140-M (collectively referred to hereinafter as protected objects 140 or individually as a protected object 140) are connected to the edge networks 130. The protected object 140 may be a tenant, a computing infrastructure, a server or group of servers, services, or a combination thereof. Typically, the protected object 140 is associated with a customer paying for the security services. A protected object 140 may be configured by an IP address for a dedicated server (for example, a single VM) protection, or by a variable size subnet for a network protection (a group of VMs). The protected object 140, in one embodiment, can be a server, or a group of servers, deployed in the backbone network 110, the edge network 130, or both.

It should be emphasized that the disclosed embodiments can also be utilized to protect the infrastructure of any of the backbone network 110 or an edge network 130. Infrastructure protection means protection of all various network entities within the networks 110 and 130. Such entities include routers, switches, firewalls, load balancers, etc. as well as their network interfaces, from being overwhelmed in cases of DoS/DDoS attacks.

According to disclosed embodiments, a plurality of data sources 150 are deployed in the backbone network 110. Each of the data sources 150 collects or otherwise stores data related to traffic within the backbone network 110 and, more specifically, traffic directed to and from the protected objects 140.

In an example embodiment, the data sources 150 are deployed at the edge of an edge network 130 and the backbone network 110. One example for data source 150 may include a router collecting Flow data (e.g., NetFlow), Border Gateway Patrol (BGP) data, Simple Network Management Protocol (SNMP) data, and the like.

In another example embodiment, the data sources 150 may not be an actual part of backbone network 110, but may reside at other parts of network 100 (which may be a large scale network). Examples for such sources include systems that provide Remote Authentication Dial-In User Services (RADIUS), DNS services, DHCP services, DPI services, and the like.

In yet another exemplary embodiment, data sources 150 may be Internet-based services. Examples for such services include WHOIS, FarSight DNSDB, ShadowServer, Shadan, GeoIP, and the like. Examples for additional data sources are provided below.

In some embodiments, the OOP detector 160 may be deployed in the backbone network 110. In other embodiments, the OOP detector 160 may be deployed as a service in the cloud. The OOP detector 160 may be communicatively connected to all of the data sources 150 and also be configured to collect data from such sources. The OOP detector 160 may further be configured to enrich Flow data with data collected from the other data sources 150. In one embodiment, based on the enriched Flow data, the OOP detector 160 may be configured to detect DDoS attacks directed against one or more of the protected objects 140.

In an embodiment, the OOP detector 160 is configured to dynamically create clusters of entities with common traffic and other behaviors. An entity may include a destination IP address, a customer service, a mobile subscriber, a home subscriber, an ISP service, and the like. An entity may also include an external entity, such as an Internet service, a Web site, and so on.

To this end, enriched Flow data may be continuously analyzed using clustering and baselining algorithms for each source and destination of traffic according to one or more features. The features may include, but are not limited to, bandwidth level, whether the traffic is directed internally or externally with respect to a service provider network, whether statistics are stationary or not, a type of application it belongs to or sends traffic to, a type of subscriber, a type of IoT device, a reputation of the entity, combinations thereof, and the like. When clusters have been dynamically created, they may be utilized to detect attacks with respect to the appropriate clusters.

The OOP detector 160 may be further configured to perform anomaly detection in various stages. A first stage may be an intra-cluster stage, or history analysis stage, in which the behavior of each member of a cluster is compared to that of other members of the cluster. The first stage may result in identifying anomalies that are unusual for the cluster. A second stage may be an inter-stage, or peer group analysis, stage, in which behaviors of members of clusters are compared to those of members of other clusters. The operation of the OOP detector 160 is described further herein below. The anomaly detection may be performed using one or more machine learning techniques.

Figure 6:
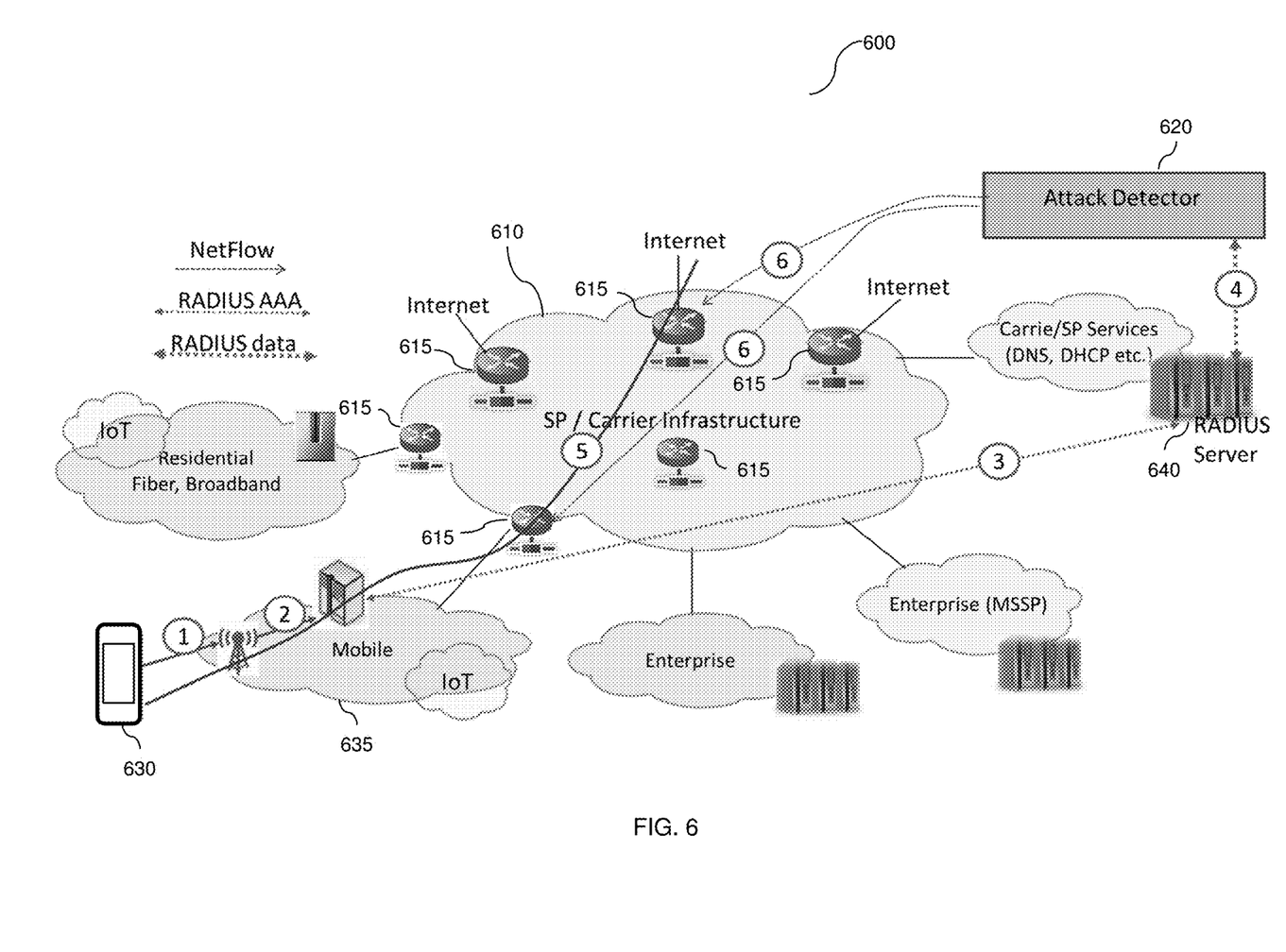
FIG. 6 is a network diagram which illustrates an exemplary detection.

A non-limiting example of OOP detection in accordance with the disclosed embodiments is now described with respect to FIG. 6.

FIG. 6 shows an example network diagram 600 illustrating a user device 630 connecting to the Internet via a mobile carrier network 635 by authenticating via RADIUS server 640. The user device 130 may be a computer, a mobile device, an IoT device, and the like, for example. The RADIUS server 640 may communicate over carrier network 610 implemented via deployment of routers 615. An attack detector 620 (hereinafter referred to as the OOP detector 620) is deployed out of path (OOP) of the communications among the carrier network 610 to collect data and detect DDoS attacks on the carrier network 610.

Traffic originates at the service provider network 610 from various sources, and may be addressed toward many destination services. When a user of user device 630 requests (1 and 2) initiation of a session for accessing the Internet via a mobile network 635, the user may be authenticated (3) via the RADIUS server 640. The OOP detector 620 retrieves (4) data from the RADIUS server including the user's cell phone number, his MSISDN, or both, which identifies the user. When the user is authenticated, and the requested session is initiated (5), the OOP detector counts (6) the traffic (e.g., with respect to bandwidth and number of packets) by collecting the Flow data from one or more routers 615 within the network. The Flow data and RADIUS server data are ingested to the detector, and the RADIUS server data is utilized to enrich the Flow data with the actual identity of users, or subscribers, communicating in the network. The users identification is further used by the clustering and baselining algorithms. The results are DoS/DDoS detection based on Flow traffic volumes together with the actual user/application identity.

Figure 2:
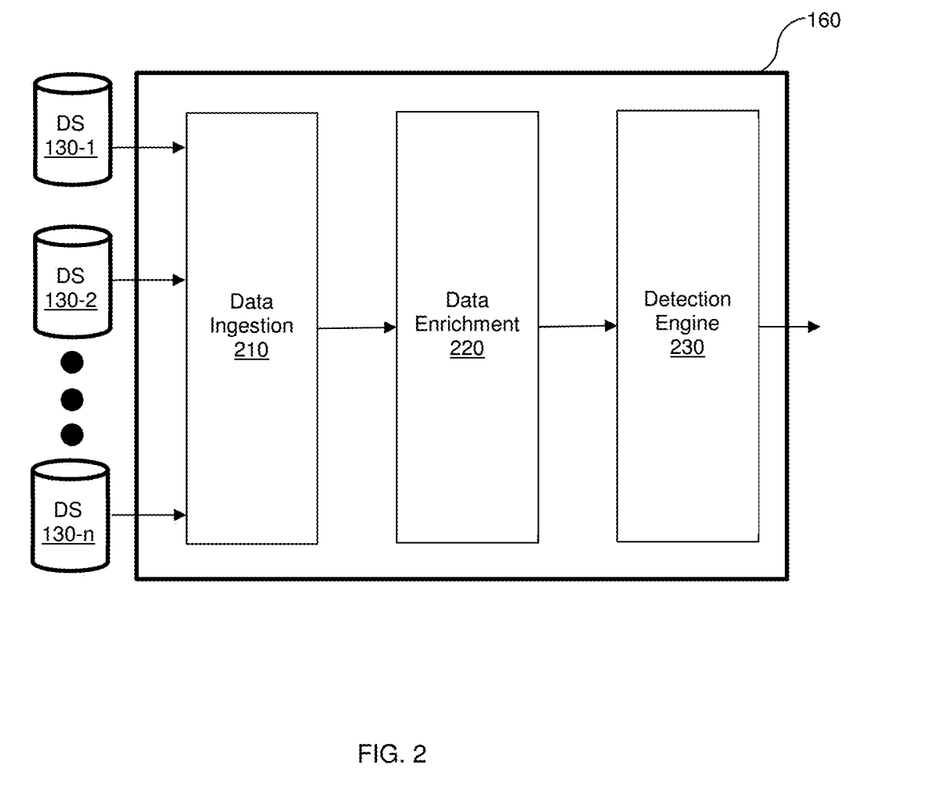
FIG. 2 is a flow diagram illustrating detection by the OOP detector according to embodiments.

FIG. 2 is an example flow diagram illustrating an embodiment for detecting DDoS attacks by the OOP detector 160. Here, data from the data sources 150 is ingested (210) and enriched (220) to create an enriched Flow data set. In an optional embodiment, the enriched Flow data set may be provided to a detection engine 230.

In some embodiments, the data ingestion 210 may include aggregating data collected from data sources 150. In an example implementation, the data may include, Flow data, BGP data, SNMP data, RADIUS data, Policy and Charging Rules Function (PCRF) data, active Domain Name Service (DNS) queries, DNSFlow, logs, data from Internet sources such as WHOIS, data from FarSight DNSDB, Shodan, Threat Intelligence feeds on attackers, data from Layer 7 entities (e.g., FW, ADCs, DPIs, etc.), Geo information from MaxMind or other sources, and the like. In various embodiments, some data feeds may be utilized as the main data feeds, with other data feeds being used for example for providing additional insights.

The main data feeds may include Flow data from routers, other Flow enabled equipment, and flow-based traffic monitoring systems. The Flow data may provide measures for the overall bandwidth (bits per second) and packets (packets per second) of Flows in the network, all on a per traffic flow basis.

Therefore, and in an example implementation, the main data feed may be Flow data received via NetFlow or another Flow protocol, while other data sources are utilized to enrich the Flow data with various meta-data to support a comprehensive detection. SNMP data may be used to provide awareness related to routers and interfaces, BGP data may be utilized to provide awareness on autonomous systems (ASs) and BGP community, RADIUS and DNS provide user and application awareness, Radius data on the subscriber identity, and the like.

Due to the requirements for detecting DDoS attacks based on the above-noted data, certain scale requirements need to be met. In an example implementation, the ingest of Flow data may require tens of millions of flows per second collected from hundreds of routes spread over various service provider networks. SNMP data collected from such routes may be required to be collected from tens of thousands of interfaces. The full BGP table needed to be maintained may include around one million routes.

The data may be collected as data feeds, as pooled sets of data, as bulk or a batch of data, or a combination thereof. The collected data may be normalized to allow for uniform processing of comparable data from different sources.

Figure 7:
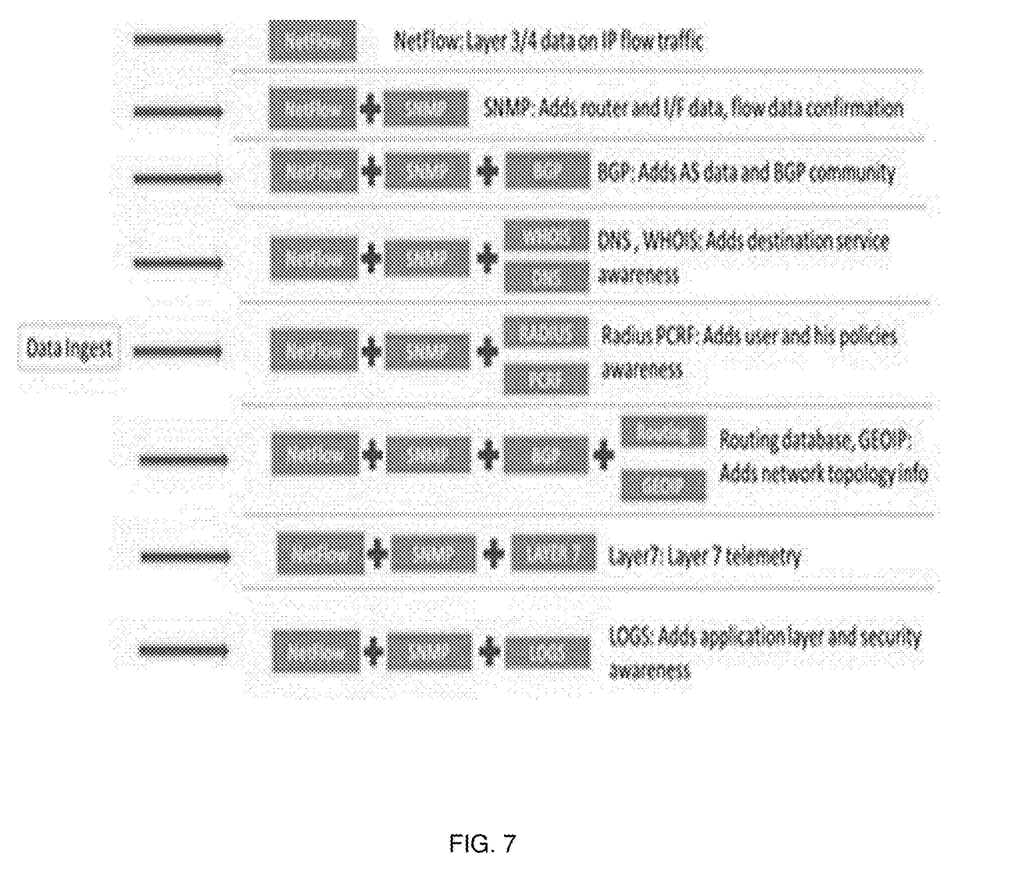
FIG. 7 is a diagram illustrating example data enrichments.

In an embodiment, the data enrichment 220 may include combining Flow data with one or more other types of data into enriched Flow data. The enriched Flow data may be stored and processed in real-time as streaming data is collected, or may be stored for subsequent batch processing. Various exemplary enriched Flow data sets may now be described. FIG. 7 illustrates some exemplary enriched Flow data sets. It may be noted that various embodiments are discussed with respect to enriched Flow data sets including enriching NetFlow data merely for exemplary purposes, but other Flow data, like sFlow, jFlow, and others, may be enriched as well.

In one example, NetFlow data may be enriched with SNMP data in order to add router and interface information, as well as to confirm flow data. In another example, NetFlow and SNMP data may be further enriched with BGP data to add AS, ASN (Autonomous System Number) information, and BGP community information. In another example, NetFlow and SNMP data may be further enriched with various DNS data, WHOIS data, or both, to add destination service awareness. As yet another example, NetFlow and SNMP data may be further enriched with RADIUS data, PCRF data, or both, to add user, or subscriber, identifications and their respective policy awareness. NetFlow, SNMP, and BGP data may be further enriched with data from a routing database, GeoIP data, or both, to add network topology information. In yet another example, NetFlow and SNMP data may be further enriched with Layer 7 data to add Layer 7 telemetries. NetFlow and SNMP data may also be further enriched with log data to add application layer and security awareness.

In some embodiments, the enriched Flow data may be provided to a detection engine 230. The detection engine 230 may be configured to generate one or more analytics and corresponding insights. The analytics may include a detection of a DDoS attack. To this end, the analytics engines may be configured to train and apply machine learning models such as classifiers.

The detection engine 230 may be an "entity aware" DDoS attack detection engine configured to characterize traffic flows, thereby enabling accurate detection of anomalies. The detection engine 230 may be configured to utilize an enriched Flow data set including Flow data enriched with entity identity information of source and destination entities.

Due to the diverse communication services having different types and characterizations provisioned by service providers, a large number of Flows occur every second, with each Flow having different characteristics and attributes. Each Flow can originate within a network or outside of the network. In some embodiments, Flows directed toward a specific IP address may be continuous or sparse in time, and IP addresses may be changed over time. Detecting attacks based on pre-defined and manually configured rules, on Flow aggregation toward destination IP only, may not allow for complete and accurate detection of attacks.

To this end, in some embodiments, the detection engine 230 may be s configured to utilize machine learning techniques for analyzing the enriched Flow data and learning the behavior of various entities in the network, and not just the behavior of destination IPs. Using these machine learning techniques, the detection engine 230 may be configured to characterize traffic flows to increase accuracy of anomaly detection, thereby allowing for precisely detecting volumetric attacks and other anomalies. In particular, the enriched Flow data may be analyzed to detect DDoS attacks with respect to destination and source entities and, more specifically, their respective properties (for example, typical traffic rates in each direction, policies, etc.). In an embodiment, the characterization of traffic flows may be based on clustering as discussed below.

The detection engine 230 may be configured to characterize traffic flows with respect to particular entities rather than with respect to, for example, destination IP addresses. Thus, the detection engine 230 may be configured to identify entities operating within the network and detect anomalies in the identified entities' behavior. Such identification allows for uniquely identifying entities, thereby providing more accurate normal behavior baselining and anomaly detection.

Accordingly, the analysis of the enriched Flow data may allow for consideration, not only of volume of traffic, but also of the nature of legitimate traffic patterns (e.g., domestic, non-domestic, continues, sparse, ingress, egress, etc.). Specifically, the nature of legitimate traffic patterns may be categorized with respect to different behavior attributes of entities, thereby allowing for recognizing traffic patterns that are unusual for each entity.

In some embodiments, the detection engine 230 may output an identification of the host under attack, normal behavior characteristics of that host, comprehensive attack attributes, a combination thereof, and the like. The outputs may be utilized to protect, for example, a carrier infrastructure by applying the appropriate mitigation action.

It should be noted that, while Flow data may be enriched at data enrichment 220, in some implementations, Flow data may be further enriched at data ingestion 210, by one or more other analytics engines (not shown), or both.

Figure 3:
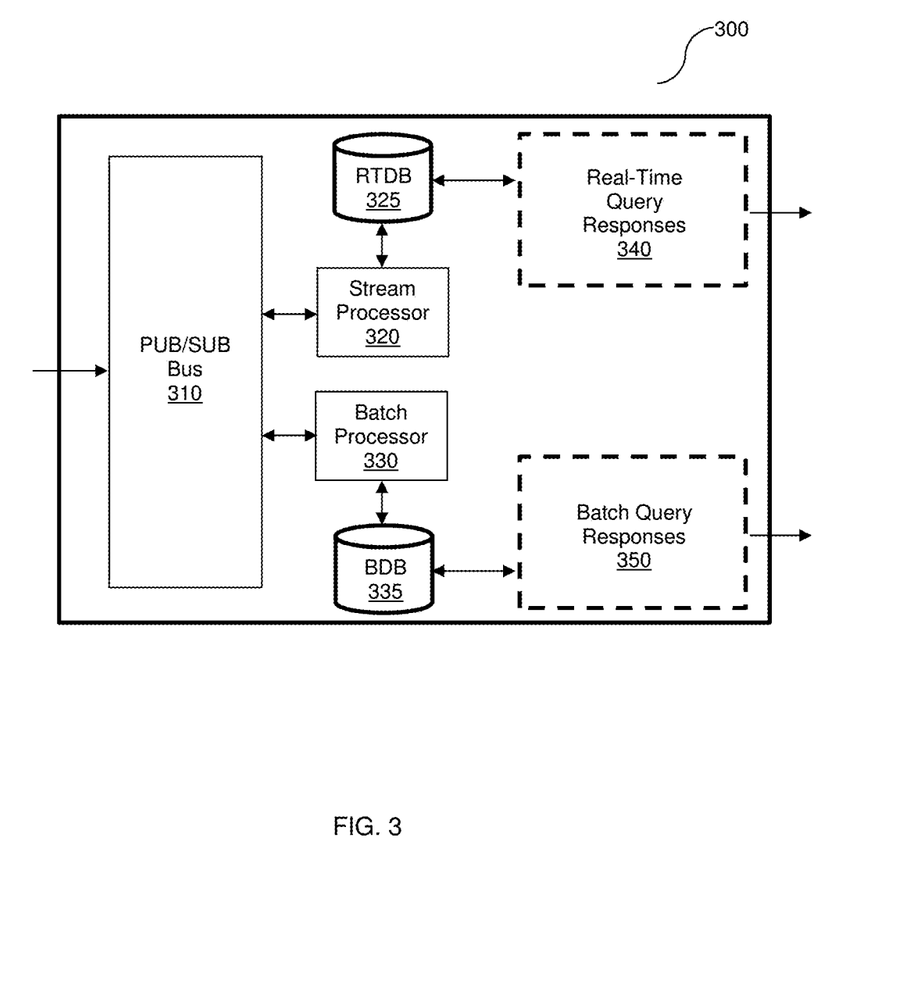
FIG. 3 is a diagram illustrating providing enriched Flow data by the OOP detector according to some embodiments.

FIG. 3 is an example block diagram 300 illustrating data ingestion and enrichment operations performed by the OOP detector 160 according to some embodiments. A publish/subscribe (PUB/SUB) bus 310 may be configured to handle ingesting of data feeds from network and other sources (i.e., the various data sources 150 in FIG. 1) and to distribute the ingested data. The data feeds may include Flow data and supplementary data from other data sources (e.g., the data sources 150, FIG. 1). The PUB/SUB bus 310 may be a high-performance message queue bus configured for ingesting and distributing high volumes of data.

In some embodiments, data distributed by the PUB/SUB bus 310 may be provided to a stream processor 320 and to a batch processor 330. Due to the variety of data feeds being ingested and utilized as well as the required enrichments and analytics, both stream and batch processing may be utilized.

Stream processing includes real-time data processing and analytics as data is ingested, and allows for immediate detection of abnormal traffic patterns so as to accelerate the subsequent mitigation actions. In some embodiments, the stream processor 320 may be configured to store both raw and processed data in a real-time database (RTDB) 325.

Batch processing may include processing high volumes of data including groups of data each collected over a period of time. To this end, the batch processor 330 may be or may include a big data processing engine (not shown). In an embodiment, the batch processor 330 may be configured to store both raw and processed data in a batch database (BDB) 335.

Once data is stored in the RTDB 325 and the BDB 335, the data may be subsequently accessed and utilized for detecting DDoS attacks. In some implementations, real-time query responses may be provided based on data in the RTDB 325, and batch query responses may be provided based on data in the BDB 335. In a further implementation, the responses 340 and 350 may be utilized by, for example, the analysis engines 230.

The various elements shown in FIG. 3 can be utilized in hardware, software, or any combination thereof. Specifically, each, some, or all of the hardware elements may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), tensor processing units (TPUs), graphics processing unit (GPUs), and the like, or any other hardware logic components that can perform calculations or other manipulations of information.

Figure 4:
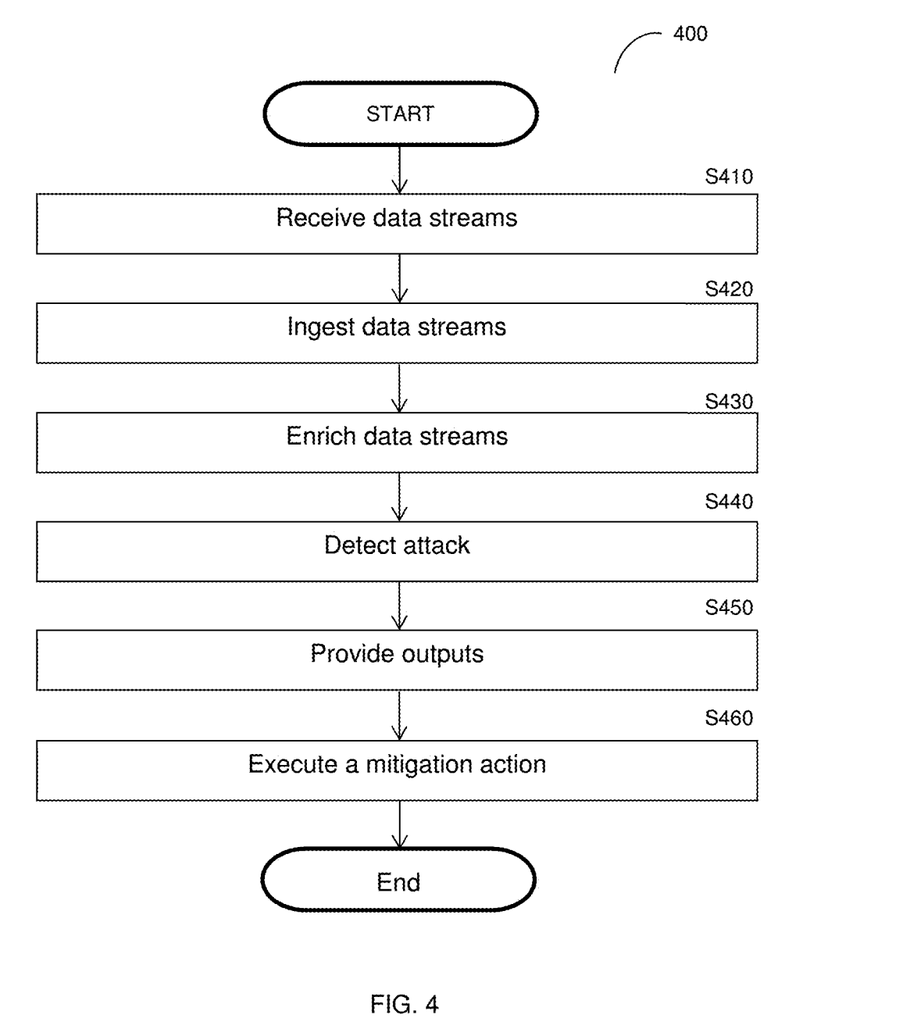
FIG. 4 is a flowchart illustrating a method for efficiently detecting OOP attacks according to some embodiments.

FIG. 4 is an example flowchart 400 illustrating a method for OOP detection of DDoS attacks according to an embodiment.

At S410, data feeds are received. The received data feeds include data Flow data (e.g., Netflow), and further include supplementary data, from the data sources 150, to be used for enriching the traffic flow data. The supplementary data may include, but is not limited to, Border Gateway Patrol (BGP) data, Simple Network Management Protocol (SNMP) data, data from Remote Authentication Dial-In User Services (RADIUS), PCRF data, active domain name service (DNS) queries, DNSFlow, logs, data from Internet sources such as WHOIS, data from FarSight DNSDB, MaxMind, GeoIP data from Layer 7 entities (e.g., FW, ADCs, DPIs, etc.), and the like.

At S420, the received data feeds are ingested. In some embodiments, S420 may include aggregating and normalizing the data feeds to allow for uniform processing of comparable data.

At S430, the ingested data may be utilized to generate enriched Flow data sets. Each enriched Flow data set may include a portion of the traffic flow data and a portion of the supplementary data. The enriched Flow data sets may include both streaming data sets created in real-time as data is ingested and batch data sets created after data has been collected for a period of time. The Flow data sets may be enriched as described further herein.

At S440, the enriched Flow data may be analyzed to detect at least a DDoS attack. In some embodiments, the enriched Flow data may be fed to a detection engine configured to determine anomalous traffic flows with respect to Flow data enriched with data related to source, destination, or both. Specifically, the detection engine may be configured to detect deviations from established baseline behaviors for particular network entities. To this end, the detection engine may be configured to analyze the enriched Flow data, to generate baselines of traffic attributes. Such attributes may include bandwidth and number of packets per second with respect to source or destination identifying data. The traffic baselining approach needs to consider the spares and bursty traffic characteristics of particular entities. In particular, traffic characteristics sent by users or received by services are considered.

In some embodiments, the analysis may be based on dynamically created clusters of entities with common traffic and other behaviors. To this end, enriched Flow data may be continuously analyzed using clustering and baselining algorithms for each source and destination entity, and rather not source and destinations' IPs, of traffic according to one or more features. The features may include, but are not limited to, bandwidth level, whether the traffic may be directed internally or externally with respect to a service provider network, whether the traffic statistics are stationary or not, a type of application, a type of subscriber, a type of IoT device, a reputation of the entity, combinations thereof, and the like. When clusters have been created, they may be utilized to detect attacks with respect to the appropriate clusters.

In a further embodiment, the anomaly detection may be performed in stages. A first stage may be an intra-cluster stage (or history analysis stage), in which the behavior of each member (network entity) of a cluster may be compared to that of other members of the cluster. The first stage may result in identifying anomalies that are unusual for the cluster, i.e. anomalies comparing to the cluster members normal behaviors. A second stage may be an inter-stage (or peer group analysis), stage, in which behaviors of members (various network entities) of clusters are compared to those of members of other clusters.

At S450, outputs are provided with respect to the detected attack. The outputs are determined based on the detection of anomalies and may include, but are not limited to, an IP address of an entity under attack, a group of IP addresses of entities under attack, a degree of the attack, attack attributes an attack signature, and the like. The attack signature may define the attributes of the attack, such as an attack type, an attack bandwidth, and so on.

At S460, a mitigation action may be executed based on the outputs related to the detected attack.

It should be noted that the method, discussed herein, may be performed by the OOP detector 160, FIG. 1. It should be further noted that the method's steps shown in FIG. 4 can be performed in parallel or sequentially.

Figure 8:
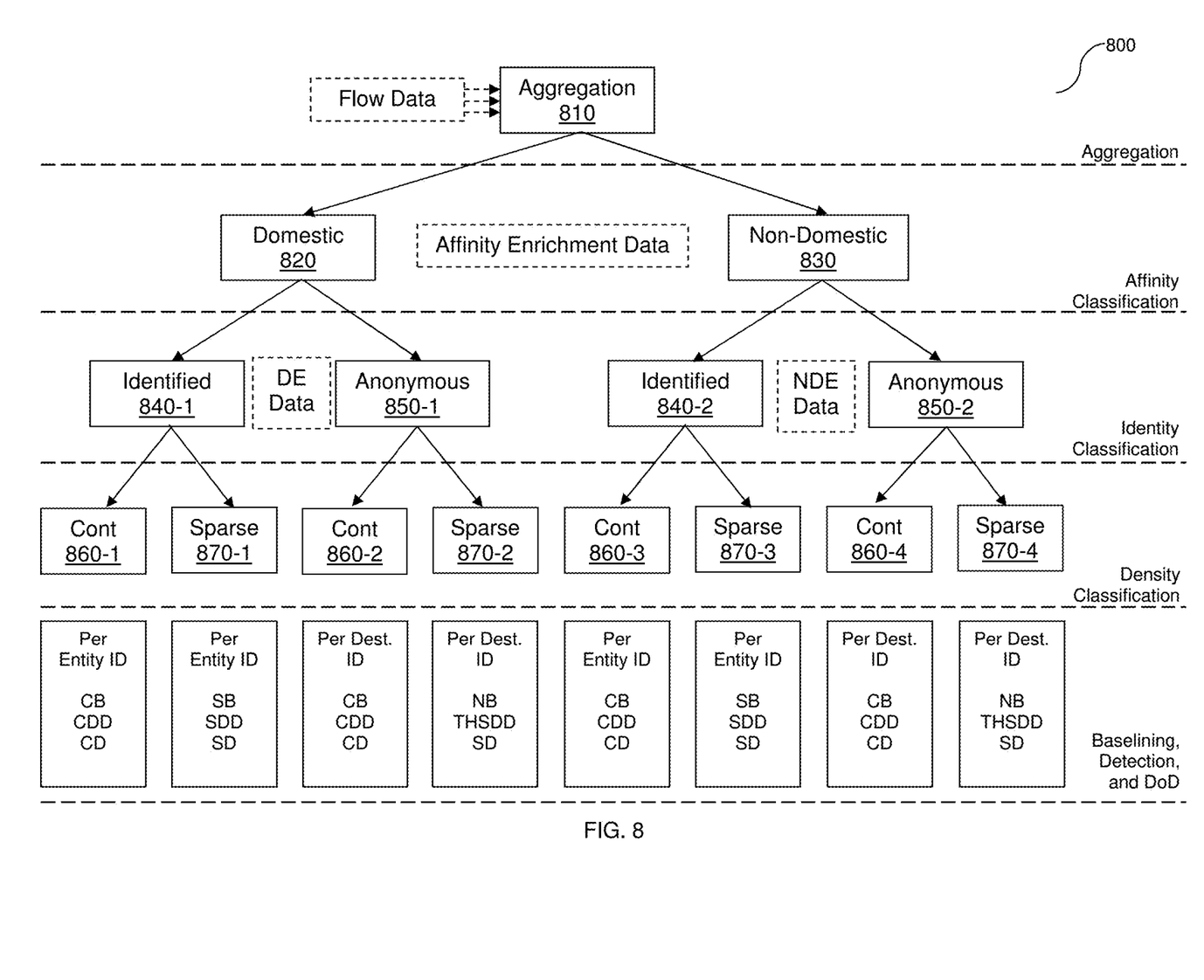
FIG. 8 is an example flow diagram illustrating the classification of enriched Flow data for OOP detection according to some embodiments.

FIG. 8 is an example flow diagram 800 illustrating the classification of enriched Flow data for OOP detection according to some embodiments. Flow data from data sources in the network are aggregated into aggregation 810. The aggregated Flow data may be related to a destination IP of each entity in the network.

The aggregated Flow data may be enriched using affinity enrichment data to classify each entity into affinity classification domestic 820 or affinity classification non-domestic 830. The domestic classification 820 and the non-domestic classification 830 indicate that the destination IP is internal or external to the service provider infrastructure, respectively. Infrastructure members may be classified using a combination of CIDRs, ASNs, BGP Communities, and the like. To this end, the affinity enrichment data may include BGP and SNMP data.

The enriched Flow data may be further enriched using domestic enrichment data and non-domestic enrichment data for each entity classified as domestic 820 and non-domestic 830, respectively, to classify the entity into an identified entity 840-1 or 840-2, or an anonymous entity 850-1 or 850-2. The identified entity classification 840-1 or 840-2 indicates that the entity is known to the detection engine. When an entity can't be identified, it may be classified as anonymous 850-1 or 850-2. When an entity is classified as identified 840-1 or 840-2, it may further be classified with respect to a particular entity ID.

Domestic IP addresses can be identified as being associated with entities such as, but not limited to, home subscribers, mobile subscribers, enterprise customers, services (e.g., DNS), applications, and the like. Accordingly, the domestic enrichment data may include, but is not limited to, RADIUS data, DNS data, DNSDB data, BSS/OSS data, and the like. Non-domestic IP addresses can be identified as being associated with entities such as, but not limited to, services (e.g., DNS, Google™, Facebook™, etc.), applications WEB, and the like. To this end, the non-domestic enrichment data may include, but is not limited to, DNS data, pDNS data, DNSDB data, DNSFlow data, WHOIS data, and the like.

The identified and anonymous entities are classified with respect to density. To this end, each entity may be classified as continuous (cont) 860-1 through 860-4 (hereinafter referred to as continuous 860, merely for simplicity purposes) or sparse 870-1 through 870-4 (hereinafter referred to as sparse 870, merely for simplicity purposes). Entities classified as continuous 860 demonstrate long term, successive traffic patterns. Entities classified as sparse 870 demonstrate bursts of non-continuous and non-stationary traffic patterns. The density classification may be per destination IP address or per entity identifier (ID).

Based on the classification, algorithms for clustering, baselining, detection, and degree of deviation are utilized. Baseline calculation of normal traffic behaviors is based on a baseline algorithm. For example, for identified and continuous traffic 860-1 and 860-3, a per entity continuous baseline (CB) algorithm may be utilized. For identified and sparse traffic 870-1 and 870-3, a per entity sparse baseline (SB) algorithm may be utilized. For anonymous and continuous traffic 860-2 and 860-4, a per destination continuous baseline may be utilized. For anonymous and sparse traffic 870-2 and 870-4, no baseline (NB) can be calculated.

Attack detection is based on a detection algorithm. For example, for identified and continuous traffic 860-1 and 860-3, a per entity continuous DDoS detection (CDD) algorithm may be utilized. For identified and sparse traffic 870-1 and 870-3, a per entity sparse DDoS detection (SDD) algorithm may be utilized. For anonymous and continuous traffic 860-2 and 860-4, a per destination continuous DDoS detection algorithm may be utilized. For anonymous and sparse traffic 870-2 and 870-4, a per destination threshold-based sparse DDoS detection (THSDD) algorithm may be utilized. Degree of deviation (DoD) detection is based on a DoD algorithm. For example, for identified and continuous traffic 860-1 and 860-3, a per entity continuous DoD (CD) algorithm may be utilized. For identified and sparse traffic 870-1 and 870-3, a per entity sparse DoD (SD) algorithm may be utilized. For anonymous and continuous traffic 860-2 and 860-4, a per destination continuous DoD algorithm may be utilized. For anonymous and sparse traffic 870-2 and 870-4, a per destination sparse DoD algorithm may be utilized.

Figure 5:
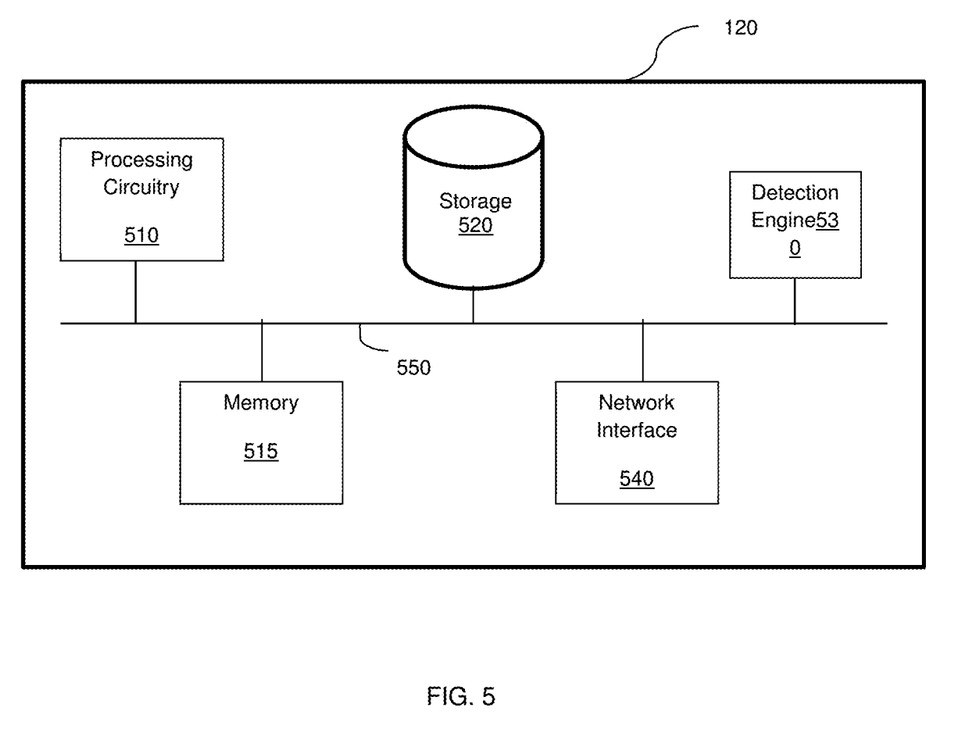
FIG. 5 is a schematic diagram of an OOP detector according to some embodiments.

FIG. 5 is an example schematic diagram of the OOP detector 160 according to some embodiments. The OOP detector 160 may include a processing circuitry 510 coupled to memory 515, storage 520, detection engine 530, and network interface 540. In some embodiments, the components of the OOP detector 160 may be communicatively connected via a bus 550.

The processing circuitry 510 may be realized as one or more hardware logic components and circuits. For example, and without limitation, illustrative types of hardware logic components that can be used include FPGAs, ASICs, ASSPs, SOCs, TNUs, general-purpose microprocessors, microcontrollers, digital DSPs, GPUs, and the like, or any other hardware logic components that can perform calculations or other manipulations of information.

Memory 515 may be volatile (e.g., RAM, etc.), non-volatile (e.g., ROM, flash memory, etc.), or a combination thereof. In one configuration, computer readable instructions to implement one or more embodiments disclosed herein may be stored in storage 520.

In another embodiment, the memory 515 may be configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 510 to perform the various processes described herein. Specifically, the instructions, when executed, cause the processing circuitry 510 to perform the embodiments described herein including aggregating and enriching data for efficient OOP DDoS attack detection.

Storage 520 may be magnetic storage, optical storage, etc. Storage 520 may be realized, for example, as flash memory or other memory technology, CD-ROM, Digital Versatile Disks (DVDs), or any other medium which can be used to store the desired information.

The detection engine 530 may be configured to detect DDoS attacks as described herein. Specifically, the detection engine may be configured to identify anomalous traffic behavior with respect to specific entities using enriched Flow data, and to detect attacks based on the identified anomalies.

The network interface 540 allows the OOP detector 160 to communicate with the data sources 150 for the purpose of, for example, receiving network and Flow data.

It should be understood that the embodiments described herein are not limited to the specific architecture illustrated in FIG. 5, and other architectures may be equally used without departing from the scope of the disclosed embodiments.

It should be noted that various embodiments described herein are discussed with respect to efficiently detecting DDoS attacks merely for simplicity purposes, and that other types of DoS attacks may be equally detected in accordance with the disclosed embodiments. Additionally, the disclosed embodiments are described with respect to one OOP detector, but may be equally implemented using multiple OOP detectors configured to operate alternatively, or to share the work between them. Further, in some embodiments, the sources of data utilized by different detectors may be different. The disclosed embodiments may be implemented on-premises of a network, remotely, for example as Software-as-a-Service (SaaS), or a combination thereof.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for out-of-path detection of cyber-attacks, comprising:
   receiving, by a detector, a plurality of data feeds from a plurality of data sources, wherein the detector is communicatively connected to the plurality of data sources;
   processing, by the detector, the plurality of received data feeds to generate enriched Flow data sets, wherein processing the plurality of received data feeds further comprises: ingesting the plurality of received data feeds to generate the enriched Flow data sets, wherein each of the enriched Flow data sets includes a portion of traffic Flow data and a portion of supplementary enrichment data, wherein the supplementary enrichment data includes information other than determined threat-related information;
   analyzing the enriched Flow data sets to detect a potential cyber-attack, wherein the potential cyber-attack is at least a distributed denial of service (DDoS) attacks and wherein analyzing to detect the potential cyber-attack is performed using a per destination threshold-based sparse DDoS detection (THSDD) algorithm for anonymous and sparse traffic in the enriched Flow data sets; and
   upon detection of a potential cyber-attack, providing indication to each network entity of the network entities that is under attack, wherein analyzing the enriched Flow data sets further comprises: clustering the enriched Flow data sets based on at least one feature of the traffic Flow data; and
   baselining the enriched Flow data sets in the same cluster according to the at least one feature.

2. The method of claim 1, further comprising:
   performing a mitigation action to protect each network entity under attack.

3. The method of claim 1, further comprising:
   normalizing the plurality of received data feeds.

4. The method of claim 1, wherein the supplementary enrichment data includes relevant data gathered from at least one of: Border Gateway Protocol (BGP), Simple Network Management Protocol (SNMP), Remote Authentication Dial-In User Services (RADIUS), Policy and Charging Rules Function (PCRF), active domain name service (DNS) queries, logs, GeoIP, IP reputation feeds, and Layer 7 entities load balancer (LB) and secure web gateway (SWG)) data.

5. The method of claim 1, wherein each of the enriched Flow data sets includes at least a source entity identification and a destination entity identification of the source and destination of traffic as appeared at the Flow data portion.

6. The method of claim 1, wherein
   the at least one feature is at least one feature of each respective pair of a source entity and a destination entity of the traffic Flow data.

7. The method of claim 6, wherein the at least one feature is any of: a bandwidth level, a type of application, a type of customer, a type of subscriber, a type of Internet of Things (IoT) device, a reputation of the network entity, affinity, direction of the traffic Flow data, and traffic statistics.

8. The method of claim 6, wherein baselining the enriched Flow data further comprises:
   detecting anomaly behavior based on intra-cluster analysis and inter-cluster analysis.

9. The method of claim 8, wherein the intra-cluster analysis further comprises:
   analyzing behavior of each network entity of a cluster against behavior of other network entities in the same cluster; and
   determining anomaly based on the analysis.

10. The method of claim 8, wherein the inter-cluster analysis further comprises:
    analyzing behavior of each network entity in a cluster against collective behavior of the respective other clusters in the network; and
    determining anomaly based on the analysis.

11. The method of claim 1, wherein the attack indication includes an attack signature.

12. The method of claim 1, wherein the potential cyber-attack is at least a distributed denial of service (DDoS) attacks and wherein analyzing to detect an attack is performed using a per entity continuous DDoS detection (CDD) algorithm for identified and continuous traffic in the enriched Flow data sets.

13. The method of claim 1, wherein the detector is deployed in a backbone network.

14. The method of claim 1, wherein the detector is a cloud service.

15. A system for out-of-path detection of cyber-attack, comprising:

a processing circuitry; and a memory, the memory containing instructions that, when executed by the processing circuitry, configure the system to:

receive, by a detector, a plurality of data feeds from a plurality of data sources, wherein the detector is communicatively connected to the plurality of data sources;

process, by the detector, the plurality of received data feeds to generate enriched Flow data sets, to process the plurality of received data feeds the system is further configured to: ingest the plurality of received data feeds to generate the enriched Flow data sets, wherein each of the enriched Flow data sets includes a portion of traffic Flow data and a portion of supplementary enrichment data, wherein the supplementary enrichment data includes information other than determined threat-related information;

analyze the enriched Flow data sets to detect a potential cyber-attack, wherein the potential cyber-attack is at least a distributed denial of service (DDoS) attacks and wherein analyzing to detect the potential cyber-attack is performed using a per destination threshold-based sparse DDoS detection (THSDD) algorithm for anonymous and sparse traffic in the enriched Flow data sets; and provide indication to each network entity of the network entities that is under attack, upon detection of a potential cyber-attack;

wherein the enriched Flow data sets are analyzed by the system being further configured to: cluster the enriched Flow data sets based on at least one feature of the traffic Flow data; and baseline the enriched Flow data sets in the same cluster according to the at least one feature.

16. The method of claim 1, wherein the potential cyber-attack is at least a distributed denial of service (DDoS) attacks and wherein analyzing to detect an attack is performed using a per entity continuous DDoS detection algorithm for identified and sparse traffic in the enriched Flow data sets.

17. The method of claim 6, wherein the clustering is performed so that clusters are dynamically created based on at least one common behavior other than common traffic.

18. A method for out-of-path detection of cyber-attacks, comprising:

receiving, by a detector, a plurality of data feeds from a plurality of data sources, wherein the detector is communicatively connected to the plurality of data sources;

processing, by the detector, the plurality of received data feeds to generate enriched Flow data sets, wherein processing the plurality of received data feeds further comprises: ingesting the plurality of received data feeds to generate the enriched Flow data sets, wherein each of the enriched Flow data sets includes a portion of traffic Flow data and a portion of supplementary enrichment data, wherein the supplementary enrichment data includes information other than determined threat-related information;

analyzing the enriched Flow data sets to detect a potential cyber-attack, wherein the potential cyber-attack is at least a distributed denial of service (DDoS) attacks and wherein analyzing to detect the potential cyber-attack is performed using a per destination continuous DDoS detection algorithm for anonymous and continuous traffic in the enriched Flow data sets; and upon detection of a potential cyber-attack, providing indication to each network entity of the network entities that is under attack, wherein analyzing the enriched Flow data sets further comprises: clustering the enriched Flow data sets based on at least one feature of the traffic Flow data; and baselining the enriched Flow data sets in the same cluster according to the at least one feature.

* * * * *